United States Patent
Hashimoto et al.

(10) Patent No.: US 7,150,942 B2
(45) Date of Patent: Dec. 19, 2006

(54) NEGATIVE ELECTRODE CURRENT COLLECTOR, NEGATIVE ELECTRODE USING THE SAME, AND NON-AQUEOUS ELECTROLYTIC SECONDARY CELL

(75) Inventors: Tatsuya Hashimoto, Osaka (JP); Yorihito Ohana, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 473 days.

(21) Appl. No.: 10/469,733

(22) PCT Filed: Aug. 8, 2002

(86) PCT No.: PCT/JP02/08145

§ 371 (c)(1),
(2), (4) Date: Sep. 3, 2003

(87) PCT Pub. No.: WO03/041194

PCT Pub. Date: May 15, 2003

(65) Prior Publication Data

US 2004/0072079 A1    Apr. 15, 2004

(30) Foreign Application Priority Data

Nov. 7, 2001    (JP) .............................. 2001-341661

(51) Int. Cl.
*H01M 4/66* (2006.01)
*H01M 4/58* (2006.01)

(52) U.S. Cl. ................. 429/245; 429/231.1; 429/231.8

(58) Field of Classification Search ............. 429/231.1, 429/231.8, 245; 420/469
See application file for complete search history.

(56) References Cited

U.S. PATENT DOCUMENTS 5,665,492 A * 9/1997 Sotomura ............... 429/245 X
6,451,135 B1 * 9/2002 Takahashi et al. ...... 420/469 X

FOREIGN PATENT DOCUMENTS

| EP | 1 038 994 A1 | 9/2000 |
|----|----|----|
| JP | 6-260168 | 9/1994 |
| JP | 11-302822 A | 11/1999 |
| JP | 11-310864 A | 11/1999 |
| JP | 2000-328159 A | 11/2000 |
| JP | 2001-126734 A | 5/2001 |
| JP | 2001-189154 A | 7/2001 |
| JP | 2001-283862 A | 10/2001 |
| WO | WO 00/15875 A2 | 3/2000 |

* cited by examiner

*Primary Examiner*—Stephen J. Kalafut
(74) *Attorney, Agent, or Firm*—McDermott Will & Emery LLP

(57) ABSTRACT

A negative electrode current collector for a non-aqueous electrolyte secondary battery comprising copper or a copper alloy, characterized in that the copper or copper alloy has a ratio $I_{200}/I_{111}$ of an intensity $I_{200}$ of a peak attributed to (200) plane to an intensity $I_{111}$ of a peak attributed to (111) plane, which satisfies the equation (1):

$$0.3 \leq I_{200}/I_{111} \leq 4.0 \qquad (1)$$

in an X-ray diffraction pattern measured using CuKα radiation as a radiation source.

3 Claims, 2 Drawing Sheets

NEGATIVE ELECTRODE CURRENT COLLECTOR, NEGATIVE ELECTRODE USING THE SAME, AND NON-AQUEOUS ELECTROLYTIC SECONDARY CELL

TECHNICAL FIELD

The present invention primarily relates to a negative electrode current collector with excellent adhesion to negative electrode active material layer for a non-aqueous electrolyte secondary battery.

BACKGROUND ART

A non-aqueous electrolyte secondary battery as typified by a lithium ion battery comprises a positive electrode, a negative electrode, a separator and a non-aqueous electrolyte. The positive electrode comprises a positive electrode current collector and a positive electrode active material layer carried thereon, and the negative electrode comprises a negative electrode current collector and a negative electrode active material layer carried thereon.

A positive electrode is usually prepared by applying, onto a positive electrode current collector, a positive electrode material mixture comprising a positive electrode active material, a conductive agent, a binder, etc, which is then dried, optionally rolled out, and cut into a predetermined shape. Likewise, a negative electrode is usually prepared by applying, onto a negative electrode current collector, a negative electrode material mixture comprising a negative electrode material, a binder, etc, which is then dried, optionally rolled out, and cut into a predetermined shape. The positive and negative electrode material mixtures contain dispersion mediums and are in the form of paste, which are respectively applied onto one face or both faces of the positive and negative current collectors.

It is effective, in the electrode plate, to improve adhesion of the current collector to the active material layer in order to yield a battery with excellent high temperature storage and charge/discharge cycle characteristics. In view of this, Japanese Laid-Open Patent Publication No. Hei 6-260168 proposes to use, as a current collector, a metallic copper with a roughened surface having asperities of 0.1 to 20 µm. Furthermore, Japanese Laid-Open Patent Publication No. Hei 11-310864 proposes a current collector comprising copper whose ratio $I_{200}/I_{220}$ of an intensity $I_{200}$ of a peak attributed to (200) plane to an intensity $I_{220}$ of a peak attributed to (220) plane in an X-ray diffraction pattern is not less than 0.3 and a copper oxide film carried on the surface thereof.

At the same time, portable devices in recent years have been required to be compact and light-weight, and operate for long periods of time; therefore, it is imperative to improve energy density of batteries that serve as a power source for portable devices. In order to cope with the requirements, a thin current collector is essential.

A conventional current collector, however, has a low strength in a thin form while it has slightly improved adhesion to an active material layer. Accordingly, an active material layer exfoliates during the high temperature storage or repetition of charge/discharge of the battery; in some cases, a current collector is ruptured during charge/discharge, furthering capacity degradation.

DISCLOSURE OF INVENTION

In view of the above problems, it is an object of the present invention to provide a non-aqueous electrolyte secondary battery with excellent storage and charge/discharge cycle characteristics by using a following negative electrode current collector with excellent adhesion to a negative electrode active material layer and high strength.

In other words, the present invention relates to a negative electrode current collector for a non-aqueous electrolyte secondary battery comprising copper or a copper alloy, characterized in that the copper or copper alloy has a ratio $I_{200}/I_{111}$ of an intensity $I_{200}$ of a peak attributed to (200) plane to an intensity $I_{111}$ of a peak attributed to (111) plane, which satisfies the equation (1):

$$0.3 \leq I_{200}/I_{111} \leq 4.0 \tag{1}$$

in an X-ray diffraction pattern measured using CuKα radiation as a radiation source.

The copper or copper alloy preferably comprises an electrolytic copper or electrolytic copper alloy.

The present invention further relates to a negative electrode for a non-aqueous electrolyte secondary battery comprising a negative electrode current collector and a negative electrode active material layer carried on at least one face of the negative electrode current collector, characterized in that the negative electrode active material layer comprises a carbonaceous material and the negative electrode current collector is the negative electrode current collector described above.

The present invention further relates to a non-aqueous electrolyte secondary battery, comprising an electrode group, a non-aqueous electrolyte and a battery case for housing the electrode group and the non-aqueous electrolyte, characterized in that: the electrode group comprises a positive electrode, a negative electrode and a separator interposed between the positive and negative electrodes; the positive electrode comprises a lithium transition metal composite oxide; and the negative electrode is the negative electrode described above.

BEST MODE FOR CARRYING OUT THE INVENTION

Figure 1:
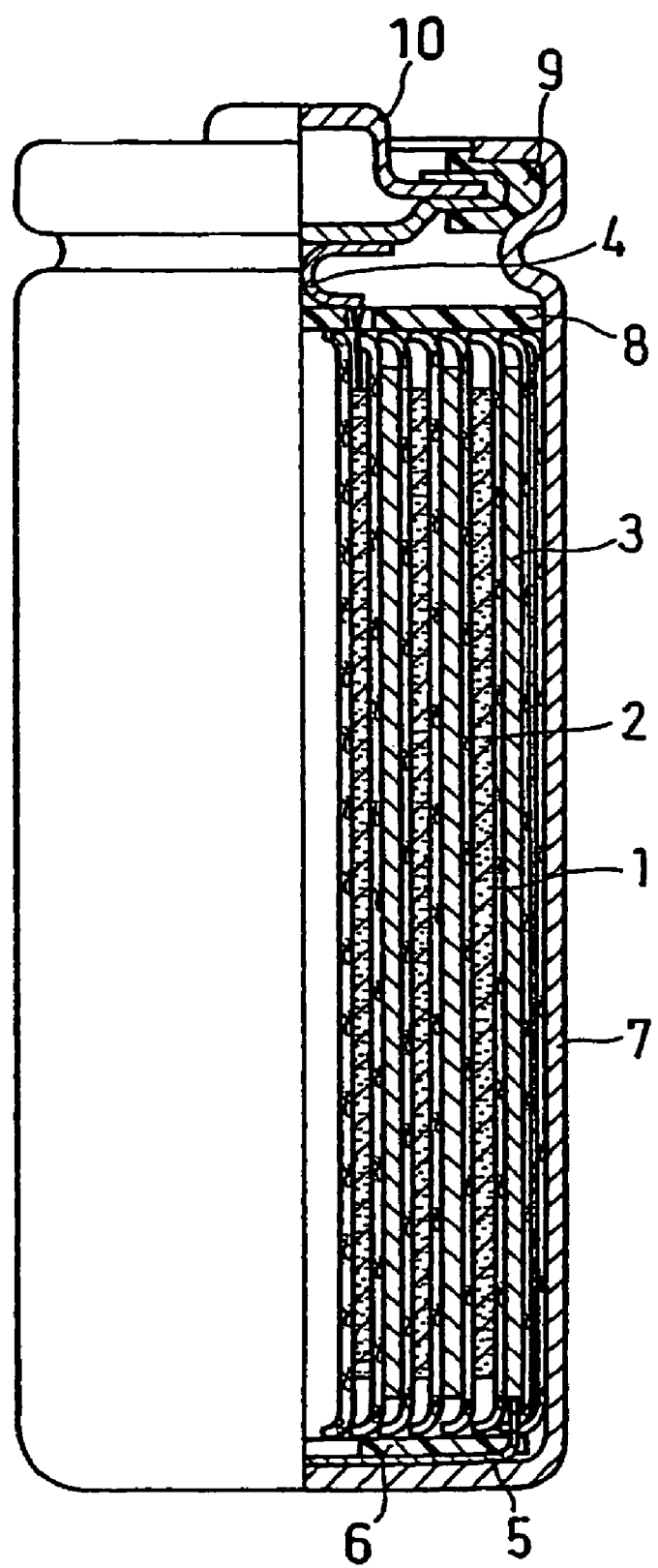
FIG. 1 is a partial vertical sectional view of a non-aqueous electrolyte secondary battery in accordance with the present invention.

The following describes a negative electrode current collector and a negative electrode in accordance with the present invention.

(i) Negative Electrode Current Collector

A current collector for a non-aqueous electrolyte secondary battery is desired to be adjustive to the swelling and contraction of the electrode material during the charge/discharge of the battery since it is required to carry active material layers.

The present invention is based on the finding that the mechanical characteristics of copper or a copper alloy such as tensile strength and elongation become suitable for a negative electrode current collector when copper or a copper alloy which constitutes a negative electrode current collector has an X-ray diffraction pattern which satisfies a given condition.

Specifically, the copper or copper alloy has a ratio $I_{200}/I_{111}$ of an intensity $I_{200}$ of a peak attributed to (200) plane to an intensity $I_{111}$ of a peak attributed to (111) plane, which satisfies the equation (1):

$$0.3 \leq I_{200}/I_{111} \leq 4.0 \tag{1}$$

in an X-ray diffraction pattern measured using CuKα radiation as a radiation source.

In this equation, $I_{200}$ and $I_{111}$ respectively represent the heights or integral intensities of peaks attributed to (200) plane and (111) plane in an X-ray diffraction pattern, and a ratio $I_{200}/I_{111}$ is calculated as a ratio of peak heights or a ratio of integral intensities of peaks.

Herein, the ratio $I_{200}/I_{111}$ is preferably calculated as a ratio of peak heights. In this case, it is preferred that fixed slits are used when an X-ray is detected and that sampling width is 2θ=0.020°. It is to be noted that the ratio of peak heights is not particularly affected by the sampling width.

When the intensity of a peak attributed to (111) plane is great, or when the intensity of a peak attributed to (200) plane is small, a large portion of the crystal of the copper or copper alloy has a closest packed structure.

The ratio $I_{200}/I_{111}$ is a factor suggesting a condition of crystal grains inside the copper or copper alloy. When the ratio $I_{200}/I_{111}$ is great, the distortion of the crystal structure and the grain size of the copper or copper alloy grow. Further, the greater the ratio $I_{200}/I_{111}$ is, the softer the copper or copper alloy is.

In a negative electrode using the copper or copper alloy with a ratio $I_{200}/I_{111}$ of less than 0.3, the elongation of the copper or copper alloy is small. Consequently, the negative electrode current collector cannot adjust to the swelling and contraction of the negative electrode material; thus, the negative electrode active material layer tends to exfoliate from the negative electrode current collector.

Conversely, in a negative electrode using the copper or copper alloy with a ratio $I_{200}/I_{111}$ of over 4.0, the strength of the copper or copper alloy is reduced and cracks are likely to occur in the negative electrode current collector; therefore, the active material layer is likely to exfoliate from the cracked portion. Additionally, an excessively soft negative electrode current collector is suitable for the swelling and contraction during charge/discharge cycles; however, the production yield and the accuracy of rolling-out process or the like in the steps of producing the electrode plate are lowered.

In view of the above, the ratio $I_{200}/I_{111}$ is required to be within the range of 0.3 to 4.0, and most preferably 0.4 to 1.0.

Incidentally, the copper or copper alloy with the ratio $I_{200}/I_{111}$ which satisfies the above equation (1) is easily prepared by heat-treating copper or a copper alloy in a non-oxidizing atmosphere.

The non-oxidizing atmosphere is preferably an atmosphere of carbon monoxide, nitrogen or argon, but it is not necessarily limited to them. The heating temperature is preferably 110 to 220° C. The heating time is preferably 30 minutes to 24 hours.

As a material for the negative electrode current collector, pure copper or a copper alloy is applicable. The copper alloy is preferably, but not necessarily limited to, a copper alloy prepared by adding, to copper, at least one element M selected from the group consisting of zinc, silver and tin. It is preferred that the copper alloy contains 0.01 to 30 parts by weight of the element M per 100 parts by weight of copper.

Further, a trace amount of elements such as P, Fe and Ag may be added to the copper or copper alloy. The addition of these elements improves characteristics that are necessary when applied to a non-aqueous electrolyte secondary battery, such as durability, heat resistance, flexibility and electrical conductivity, without harming the battery performance.

Copper contains unavoidable impurities such as Ni and Sn, but their presence is allowed unless the unavoidable impurities harm the battery performance.

A negative electrode current collector in accordance with the present invention preferably comprises copper or a copper alloy obtained by electrolytic deposition. Electrolytic deposition is a technique to deposit copper or a copper alloy on an electrode by immersing the electrode in an aqueous solution containing copper ions and applying an electric current to the electrode. The implementation of the electrolytic deposition reduces the concentration of impurities in the copper or copper alloy; therefore, copper or a copper alloy with high crystallinity can be obtained. Since a copper alloy with a reduced amount of impurities exhibits high mechanical strength, the strength of the current collector can be further improved.

Since the exfoliation of the active material layer can be reduced by enhancing the tensile strength, a negative electrode current collector in accordance with the present invention preferably has a greater thickness. When the thickness of the current collector is increased, however, the percentage of the active material layer in the battery is reduced, resulting in a lower energy density. Accordingly, the negative electrode current collector preferably has a thickness of not greater than 15 μm, and most preferably 6 to 12 μm.

As the negative electrode current collector, there are a foil, a film, a sheet, a net, a punched sheet, a lath, a porous sheet, a foam and a molded article of fiber bundle or non-woven fabric. The surface of the negative electrode current collector may be roughened by surface treatment.

(ii) Negative Electrode

In order to obtain a negative electrode in accordance with the present invention, first of all, a negative electrode active material, a binder, optionally a conductive agent, a dispersion medium, etc are mixed together to give a negative electrode material mixture. Subsequently, the negative electrode material mixture is applied onto the negative electrode current collector described above, which is then dried and rolled out to give an electrode plate. The electrode plate is cut into a predetermined shape.

The preferred negative electrode active materials for use include, for example, materials being capable of absorbing and desorbing lithium ions and having a graphite-type crystal structure such as natural graphite and artificial graphite. Particularly, a carbonaceous material having a graphite-type crystal structure in which the interplanar spacing ($d_{002}$) between the (002) planes is 3.350 to 3.400 Å is preferred for use.

As the binder, dispersion medium and conductive agent, materials like in the case of the positive electrode, which is discussed below, can be used.

Since a negative electrode using a current collector in accordance with the present invention is tolerant of the swelling and contraction of the active material layers, the adhesion of current collector to the active material layer can always be maintained. As a result, a non-aqueous electrolyte secondary battery with excellent charge/discharge cycle and high temperature storage characteristics can be obtained.

(iii) Non-Aqueous Electrolyte Secondary Battery

The above-mentioned negative electrode together with a positive electrode described below are spirally wound using a core rod. At this time, since they need to be spirally wound as tightly as possible so that they fit inside the battery case, the negative electrode preferably has a thickness of 140 to 210 μm and flexibility at the same time.

FIG. 1 is a partially sectional longitudinal view of a cylindrical non-aqueous electrolyte secondary battery in accordance with the present invention.

As shown in FIG. 1, an electrode group formed by spirally winding a positive electrode 1 and a negative electrode 3 with a separator 2 interposed therebetween is housed in a bottomed cylindrical battery case 7. A positive electrode lead 4 attached to the positive electrode 1 is electrically connected to the internal terminal of a sealing plate 10 through an upper insulating plate 8, and a negative electrode lead 5 attached to the negative electrode 3 is electrically connected to the battery case 7 through a lower insulating plate 6. A non-aqueous electrolyte (not shown in the figure) is injected into the battery case 7, and then the opening of the battery case 7 is sealed by crimping the edge of the battery case 7 to the sealing plate 10 via an insulating gasket 9.

The positive electrode can be prepared by applying a positive electrode material mixture onto one surface or both surfaces of a positive electrode current collector, followed by drying and rolling out. The preferred materials for use in the positive electrode current collector include an aluminum foil, a lathed foil and an etched foil.

The positive electrode material mixture is prepared by mixing a positive electrode active material, a binder, optionally a conductive agent and a dispersion medium.

For the similar reason to the negative electrode, since the obtained positive electrode is placed on the negative electrode with a separator interposed therebetween, the positive electrode preferably has a thickness of 130 to 200 μm and flexibility.

As the positive electrode active material, for example, a lithium transition metal composite compound capable of absorbing lithium ions as a guest is used. To be more specific, a composite metal oxide of lithium and at least one metal selected from cobalt, manganese, nickel, chrome, iron and vanadium is preferably used. The preferred composite metal oxides include $LiCoO_2$, $LiMnO_2$, $LiNiO_2$, $LiCo_xNi_{(1-x)}O_2$ ($0<x<1$), $LiCrO_2$, $\alpha LiFeO_2$, $LiVO_2$, etc.

Examples of the binder include fluorocarbon resin materials capable of maintaining the adhesion between the active materials, polymer materials having a polyalkylene oxide skeleton, and styrene-butadiene copolymer rubbers. The preferred fluorocarbon resin materials include polyvinylidene fluoride (PVDF), vinylidene fluoride-hexafluoropropylene copolymers (P(VDF-HFP)), etc.

The preferred conductive agents include carbonaceous conductive agents such as acetylene black, graphites and carbon fiber.

The suitable dispersion media are those that are capable of dissolving the binder. As an organic dispersion medium, there are acetone, cyclohexanone, N-methyl-2-pyrrolidone (NMP), methyl ethyl ketone (MEK), etc, which are preferably used singly or in combination. A preferred aqueous dispersion medium is water.

As the separator, micro-porous films made of polyolefin resin such as polyethylene resin and polypropylene resin are preferred for use.

The non-aqueous electrolyte is prepared by dissolving a solute in a non-aqueous solvent.

The non-aqueous solvent is preferably composed of a cyclic carbonate and a chain carbonate as main components. Preferably, the cyclic carbonate is at least one selected from ethylene carbonate (EC), propylene carbonate (PC) and butylene carbonate (BC). Likewise, the chain carbonate is preferably at least one selected from dimethyl carbonate (DMC), diethyl carbonate (DEC), ethyl methyl carbonate (EMC), etc.

As the solute, a lithium salt with a strong electron withdrawing property, for instance, is preferred for use. Examples of such lithium salt include $LiPF_6$, $LiBF_4$, $LiClO_4$, $LiAsF_6$, $LiCF_3SO_3$, $LiN(SO_2CF_3)_2$, $LiN(SO_2C_2F_5)_2$, $LiC(SO_2CF_3)_3$. These solutes may be used singly or in combination of two or more. These solutes are preferably dissolved in the non-aqueous solvent at a concentration of 0.5 to 1.5 mol/L.

In the following, examples and comparative examples illustrate the present invention in detail but are not to be construed to limit the present invention.

EXAMPLE 1

(i) Production of Negative Electrode Current Collector

A metal drum with a polished surface was immersed in an aqueous solution of copper sulfate in a large-capacity container. The surface of the metal drum was made of titanium. An electric current was allowed to flow between the drum and a counter electrode while the metal drum was slowly rotated; thereby, copper was deposited on the surface of the drum to form an electrolytic copper film with a thickness of 12 μm. In addition, while an electric current was allowed to flow between the drum and a counter electrode, an aqueous solution of copper sulfate was being supplied in the container.

The obtained electrolytic copper film was heated at 150° C. in a non-oxidizing atmosphere composed of carbon monoxide gas for 1 hour to give a negative electrode current collector "A" of the present invention.

In the X-ray diffraction pattern of the negative electrode current collector (sampling width: $2\theta=0.020°$), the ratio $I_{200}/I_{111}$ of an intensity $I_{200}$ of a peak attributed to (200) plane to an intensity $I_{111}$ of a peak attributed to (111) plane was 1.0. It is to be noted that the height of a peak was referred to as peak intensity. Ditto for the following examples and comparative examples.

(ii) Production of Negative Electrode

A negative electrode material mixture was obtained by mixing 50 parts by weight of flake graphite powder (mean particle size of 20 μm) as the negative electrode material, 5 parts by weight of styrene-butadiene rubber as the binder, and, as the thickener, 23 parts by weight of aqueous solution in which 1 part by weight of carboxymethyl cellulose was dissolved in 99 parts by weight of water, followed by kneading.

The obtained negative electrode material mixture was applied onto the both surfaces of the negative electrode current collector by doctor blade process to give an active material layer with a thickness of 200 μm, which was then dried, rolled out to have a thickness of 160 μm and cut into a predetermined size with the current collector. Thus, a negative electrode "A" comprising the negative electrode current collector and the negative electrode active material layer carried on the both surfaces of the negative electrode current collector was obtained.

(iii) Production of Positive Electrode

A positive electrode material mixture was obtained by mixing 50 parts by weight of LiCoO$_2$ powder (mean particle size of 10 µm) as the positive electrode active material, 1.5 parts by weight of acetylene black as the conductive agent, 7 parts by weight of aqueous dispersion containing 50 weight % of polytetrafluoroethylene (PTFE) as the binder, and, as the thickener, 41.5 parts by weight of aqueous solution in which 1 part by weight of carboxymethyl cellulose was dissolved in 99 parts by weight of water, followed by kneading.

The obtained positive electrode material mixture was applied onto the both surfaces of a positive electrode current collector made of aluminum foil with a thickness of 30 µm by doctor blade process to give an active material layer with a thickness of 230 µm, which was then dried, rolled out to have a thickness of 180 µm and cut into a predetermined size with the current collector. Thus, a positive electrode comprising the positive electrode current collector and the positive electrode active material layer carried on the both surfaces of the positive electrode current collector was obtained.

(iv) Production of Battery

Next, a cylindrical non-aqueous electrolyte secondary battery as shown in FIG. 1 was assembled.

A positive electrode 1 and a negative electrode 3 which were produced in the above manner, were spirally wound with a 20 µm thick micro-porous film separator 2 made of polypropylene resin interposed therebetween to give a wound electrode group. This electrode group was housed in a battery case 7.

Then, a negative electrode lead 5 attached to the negative electrode 3 was electrically connected to the battery case 7 through a lower insulating plate 8 (sic). Likewise, a positive electrode lead 4 attached to the positive electrode 1 was electrically connected to the internal terminal of a sealing plate 10 through an upper insulating plate 8.

After these operations, a given amount of non-aqueous electrolyte (not shown in the figure) was injected, and then the opening of the battery case 7 was sealed by crimping the edge of the battery case 7 to the sealing plate 10 via an insulating gasket 9 to give a battery "A" with a diameter of 17 mm, a height of 50 mm and a battery capacity of 780 mAh.

Herein, the non-aqueous electrolyte was prepared by dissolving lithium hexafluorophosphate (LiPF$_6$) as solute in a solvent mixture of 30 volume % of ethylene carbonate, 50 volume % of ethyl methyl carbonate, 20 volume % of methyl propionate at a concentration of 1.0 mol/L. The non-aqueous electrolyte permeates throughout the positive and negative electrode active material layers, and during electrochemical reaction it passes through the micro-porous film separator to facilitate Li ions to move between the positive electrode 1 and the negative electrode 3.

EXAMPLE 2

In the same manner as in Example 1, an electrolytic copper film with a thickness of 12 µm was produced, which was then heated at 120° C. in a non-oxidizing atmosphere composed of nitrogen gas for 1 hour to give a negative electrode current collector "B". In the X-ray diffraction pattern of the negative electrode current collector "B", the ratio $I_{200}/I_{111}$ of an intensity $I_{200}$ of a peak attributed to (200) plane to an intensity $I_{111}$ of a peak attributed to (111) plane was 0.3.

A negative electrode "B" was produced using the negative electrode current collector "B" in the same manner as in Example 1. Then, a cylindrical battery "B" was assembled in the same manner as in Example 1 except that the negative electrode "B" was used.

EXAMPLE 3

In the same manner as in Example 1, an electrolytic copper film with a thickness of 12 µm was produced, which was then heated at 200° C. in a non-oxidizing atmosphere composed of carbon monoxide gas for 1 hour to give a negative electrode current collector "C". In the X-ray diffraction pattern of the negative electrode current collector "C", the ratio $I_{200}/I_{111}$ of an intensity $I_{200}$ of a peak attributed to (200) plane to an intensity $I_{111}$ of a peak attributed to (111) plane was 4.0.

A negative electrode "C" was produced using the negative electrode current collector "C" in the same manner as in Example 1. Then, a cylindrical battery "C" was assembled in the same manner as in Example 1 except that the negative electrode "C" was used.

EXAMPLE 4

In the same manner as in Example 1, an electrolytic copper film with a thickness of 15 µm was produced, which was then heated at 150° C. in a non-oxidizing atmosphere composed of nitrogen gas for 1 hour to give a negative electrode current collector "D". In the X-ray diffraction pattern of the negative electrode current collector "D", the ratio $I_{200}/I_{111}$ of an intensity $I_{200}$ of a peak attributed to (200) plane to an intensity $I_{111}$ of a peak attributed to (111) plane was 1.0.

A negative electrode "D" was produced using the negative electrode current collector "D" in the same manner as in Example 1. Then, a cylindrical battery "D" was assembled in the same manner as in Example 1 except that the negative electrode "D" was used.

EXAMPLE 5

In the same manner as in Example 1, an electrolytic copper film with a thickness of 12 µm was produced, which was then heated at 130° C. in a non-oxidizing atmosphere composed of carbon monoxide gas for 1 hour to give a negative electrode current collector "E". In the X-ray diffraction pattern of the negative electrode current collector "E", the ratio $I_{200}/I_{111}$ of an intensity $I_{200}$ of a peak attributed to (200) plane to an intensity $I_{111}$ of a peak attributed to (111) plane was 0.4.

A negative electrode "E" was produced using the negative electrode current collector "E" in the same manner as in Example 1. Then, a cylindrical battery "E" was assembled in the same manner as in Example 1 except that the negative electrode "E" was used.

EXAMPLE 6

In the same manner as in Example 1, an electrolytic copper film with a thickness of 6 µm was produced, which was then heated at 150° C. in a non-oxidizing atmosphere composed of carbon monoxide gas for 1 hour to give a negative electrode current collector "F". In the X-ray diffraction pattern of the negative electrode current collector "F", the ratio $I_{200}/I_{111}$ of an intensity $I_{200}$ of a peak attributed to (200) plane to an intensity $I_{111}$ of a peak attributed to (111) plane was 1.0.

A negative electrode "F" was produced using the negative electrode current collector "F" in the same manner as in Example 1. Then, a cylindrical battery "F" was assembled in the same manner as in Example 1 except that the negative electrode "F" was used.

EXAMPLE 7

In the same manner as in Example 1, an electrolytic copper film with a thickness of 18 μm was produced, which was then heated at 150° C. in a non-oxidizing atmosphere composed of carbon monoxide gas for 1 hour to give a negative electrode current collector "G". In the X-ray diffraction pattern of the negative electrode current collector "G", the ratio $I_{200}/I_{111}$ of an intensity $I_{200}$ of a peak attributed to (200) plane to an intensity $I_{111}$ of a peak attributed to (111) plane was 1.0.

A negative electrode "G" was produced using the negative electrode current collector "G" in the same manner as in Example 1. Then, a cylindrical battery "G" was assembled in the same manner as in Example 1 except that the negative electrode "G" was used.

EXAMPLE 8

In the same manner as in Example 1, an electrolytic copper film with a thickness of 12 μm was produced, which was then heated at 140° C. in a non-oxidizing atmosphere composed of carbon monoxide gas for 1 hour to give a negative electrode current collector "H". In the X-ray diffraction pattern of the negative electrode current collector "H", the ratio $I_{200}/I_{111}$ of an intensity $I_{200}$ of a peak attributed to (200) plane to an intensity $I_{111}$ of a peak attributed to (111) plane was 0.7.

A negative electrode "H" was produced using the negative electrode current collector "H" in the same manner as in Example 1. Then, a cylindrical battery "H" was assembled in the same manner as in Example 1 except that the negative electrode "H" was used.

COMPARATIVE EXAMPLE 1

In the same manner as in Example 1, an electrolytic copper film with a thickness of 12 μm was produced, which was referred to as negative electrode current collector "I"; incidentally, the electrolytic copper film was not subjected to a heat treatment in a non-oxidizing atmosphere composed of carbon monoxide gas. In the X-ray diffraction pattern of the negative electrode current collector "I", the ratio $I_{200}/I_{111}$ of an intensity $I_{200}$ of a peak attributed to (200) plane to an intensity $I_{111}$ of a peak attributed to (111) plane was 0.25.

A negative electrode "I" was produced using the negative electrode current collector "I" in the same manner as in Example 1. Then, a cylindrical battery "I" was assembled in the same manner as in Example 1 except that the negative electrode "I" was used.

COMPARATIVE EXAMPLE 2

In the same manner as in Example 1, an electrolytic copper film with a thickness of 12 μm was produced, which was then heated at 250° C. in a non-oxidizing atmosphere composed of carbon monoxide gas for 1 hour to give a negative electrode current collector "J". In the X-ray diffraction pattern of the negative electrode current collector "J", the ratio $I_{200}/I_{111}$ of an intensity 1200 of a peak attributed to (200) plane to an intensity $I_{111}$ of a peak attributed to (111) plane was 5.0.

A negative electrode "J" was produced using the negative electrode current collector "J" in the same manner as in Example 1. Then, a cylindrical battery "J" was assembled in the same manner as in Example 1 except that the negative electrode "J" was used.

COMPARATIVE EXAMPLE 3

Copper was rolled out to give a rolled copper sheet with a thickness of 12 μm, which was referred to as negative electrode current collector "K"; incidentally, the rolled copper sheet was not subjected to a heat treatment in a non-oxidizing atmosphere composed of carbon monoxide gas. In the X-ray diffraction pattern of the negative electrode current collector "K", the ratio $I_{200}/I_{111}$ of an intensity $I_{200}$ of a peak attributed to (200) plane to an intensity $I_{111}$ of a peak attributed to (111) plane was 6.8.

A negative electrode "K" was produced using the negative electrode current collector "K" in the same manner as in Example 1. Then, a cylindrical battery "K" was assembled in the same manner as in Example 1 except that the negative electrode "K" was used.

The negative electrodes "A" to "K" thus obtained are listed in Table 1.

TABLE 1

|  | Copper type | Heat treatment | Thickness (μm) | $I_{200}/I_{111}$ | Tensile strength (N/mm²) | Elongation (%) |
| --- | --- | --- | --- | --- | --- | --- |
| Negative electrode plate A | Electrolytic copper | 150° C. · 1 h | 12 | 1.0 | 250 | 4.0 |
| Negative electrode plate B | Electrolytic copper | 120° C. · 1 h | 12 | 0.3 | 320 | 2.4 |
| Negative electrode plate C | Electrolytic copper | 200° C. · 1 h | 12 | 4.0 | 200 | 5.8 |
| Negative electrode plate D | Electrolytic copper | 150° C. · 1 h | 15 | 1.0 | 250 | 4.1 |
| Negative electrode plate E | Electrolytic copper | 130° C. · 1 h | 12 | 0.4 | 300 | 3.3 |

TABLE 1-continued

|  | Copper type | Heat treatment | Thickness (μm) | $I_{200}/I_{111}$ | Tensile strength (N/mm$^2$) | Elongation (%) |
|---|---|---|---|---|---|---|
| Negative electrode plate F | Electrolytic copper | 150° C. · 1 h | 6 | 1.0 | 240 | 4.2 |
| Negative electrode plate G | Electrolytic copper | 150° C. · 1 h | 18 | 1.0 | 230 | 4.6 |
| Negative electrode plate H | Electrolytic copper | 140° C. · 1 h | 12 | 0.7 | 280 | 3.7 |
| Negative electrode plate I | Electrolytic copper | No heat treatment | 12 | 0.25 | 370 | 1.9 |
| Negative electrode plate J | Electrolytic copper | 250° C. · 1 h | 12 | 5.0 | 140 | 9.7 |
| Negative electrode plate K | Rolled copper | No heat treatment | 12 | 6.8 | 130 | 6.2 |

[Evaluation of Negative Electrode]

Five JIS No. 5 tensile test pieces were obtained by cutting each of the negative electrodes "A" to "K" shown in Table 1, which were then subjected to a tensile test to determine tensile strength and elongation. It is to be noted that, in the example in which a rolled copper sheet was used, the direction parallel to the rolling direction was adopted as tensile direction.

Additionally, the elongation was calculated by the following equation:

$$\text{Elongation}(\%) = \{(\text{length of test piece at broken point} - \text{length of original test piece})/(\text{length of original test piece})\} \times 100.$$

Table 1 also shows the average tensile strength and elongation of five test pieces.

[Battery Evaluation]

Next, 20 of each of the batteries "A" to "K" were used in order to evaluate storage and charge/discharge cycle characteristics.

(i) Storage Characteristics

Each of the batteries was charged and discharged in an atmosphere of 20° C.; subsequently, the discharge capacity was measured. The capacity at this time was referred to as initial capacity. Later, the battery was charged again and stored in an atmosphere of 60° C. for 20 days; thereafter, the discharge capacity was measured again. The capacity at this time was referred to as capacity after storage.

The charge was performed by a constant current/constant voltage charge under 4.2 V for 2 hours. At the time of charging, a constant current charge of 550 mA (0.7 CmA) was performed until the battery voltage reached 4.2 V. Subsequently, the battery was kept charged until the current value decreased to 40 mA (0.05 CmA). The discharge was performed at a constant current of 780 mA (1 CmA) to an end-of-discharge voltage of 3.0 V.

The initial capacity and capacity after storage thus obtained were substituted into the following equation to determine storage recoverability:

$$\text{Storage recoverability (\%)} = \{(\text{capacity after storage})/(\text{initial capacity})\} \times 100.$$

The average storage recoverability of 20 batteries is shown in Table 2.

(ii) Charge/Discharge Cycle Characteristics

Each of the batteries was put through repeated cycles of charge/discharge in an atmosphere of 20° C. using the above-described charge/discharge conditions. The capacity at the 3rd cycle was referred to as initial capacity, and the number of cycles was counted until the discharge capacity decreased to 80% of the initial capacity. The average number of cycles of 20 batteries is shown in Table 2.

(iii) Adhesion

Figure 2:
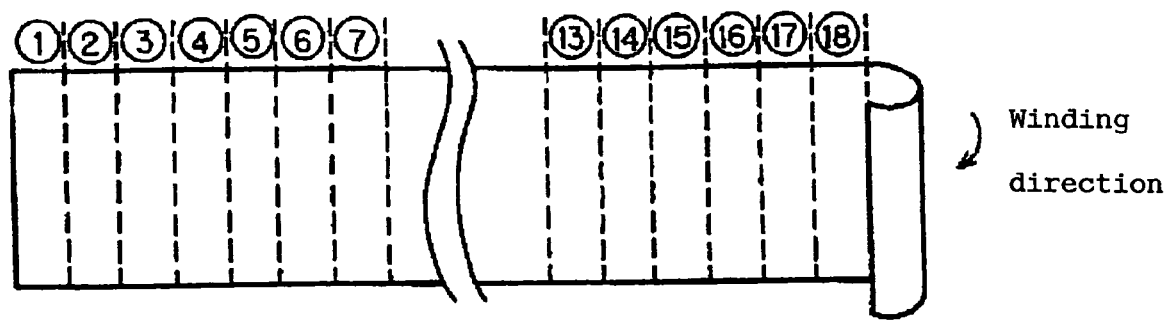
FIG. 2 is a schematic view of a negative electrode of the present invention divided into 20 portions for adhesion evaluation of a negative electrode current collector and a negative electrode active material layer.

Each of the batteries "A" to "K" was disassembled when the capacity decreased to 80% of the initial capacity, and the negative electrodes "A" to "K" were respectively taken out of the batteries "A" to "K". As shown in FIG. 2, the negative electrode was divided into equivalent 20 portions and every single portion was visually checked.

When not less than 50% of the negative electrode active material layer was present on one portion of the negative electrode current collector, 1 point was given; accordingly, when not less than 50% of the negative electrode active material layer was present on every single portion, 20 points were given. In this manner, the adhesion of current collector to active material layer was evaluated, and at the same time, the presence of cracks in the negative electrode current collector was checked. The results are shown in Table 2.

TABLE 2

|  | Adhesion | Cracks | Storage recoverability (%) | Cycle life (cycles) |
|---|---|---|---|---|
| Battery A | 20 | No | 99 | 430 |
| Battery B | 20 | No | 98 | 407 |
| Battery C | 20 | No | 99 | 423 |
| Battery D | 20 | No | 98 | 426 |
| Battery E | 20 | No | 98 | 418 |
| Battery F | 20 | No | 98 | 421 |

TABLE 2-continued

| | Adhesion | Cracks | Storage recoverability (%) | Cycle life (cycles) |
|---|---|---|---|---|
| Battery G | 19 | No | 96 | 408 |
| Battery H | 20 | No | 98 | 425 |
| Battery I | 6 | No | 72 | 331 |
| Battery J | 10 | Yes | 82 | 359 |
| Battery K | 12 | Yes | 79 | 306 |

The mechanical characteristics of the negative electrodes in Tables 1 and the results in Table 2 indicate the following.

Presumably, when the ratio $I_{200}/I_{111}$ is less than 0.3, since the copper has a random crystal orientation and reduced softness, the current collector cannot tolerate the swelling and contraction of the negative electrode active material layer during charge/discharge cycles; as a result, the negative electrode active material layer exfoliates from the current collector. When the ratio $I_{200}/I_{111}$ is over 4.0, on the other hand, crystal grains of the copper grow larger to reduce the tensile strength of the copper and cause cracks in the current collector; accordingly, the active material layer exfoliates from the cracked portion.

Table 2 illustrates that the negative electrodes "A" to "H" of the present invention have high adhesion to negative electrode active material layer. The batteries "A" to "H" of the present invention also exhibit excellent charge/discharge and storage characteristics.

It is to be noted that, although the above examples explained the present invention using cylindrical batteries, the present invention is not limited to this battery shape and applicable to a secondary battery in any form such as flat and rectangular.

INDUSTRIAL APPLICABILITY

As described above, according to the present invention, a non-aqueous electrolyte secondary battery with excellent storage and charge/discharge characteristics can be obtained by using a negative electrode current collector with excellent adhesion to negative electrode active material layer and high strength.

The invention claimed is:

1. A negative electrode for a non-aqueous electrolyte secondary battery comprising a negative electrode current collector and a negative electrode active material layer carried on at least one face of said negative electrode current collector, characterized in that said negative electrode active material layer comprises a carbonaceous material, and said negative electrode current collector comprises copper or a copper alloy, wherein said copper or copper alloy has a ratio $I_{200}/I_{111}$ of an intensity $I_{200}$ of a peak attributed to (200) plane to an intensity $I_{111}$ of a peak attributed to (111) plane, which satisfies the equation (1):

$$0.3 \leq I_{200}/I_{111} \leq 4.0 \qquad (1)$$

in an X-ray diffraction pattern measured using CuKα radiation as a radiation source.

2. The negative electrode in accordance with claim 1, wherein said copper or copper alloy comprises an electrolytic copper or electrolytic copper alloy.

3. A non-aqueous electrolyte secondary battery comprising an electrode group, a non-aqueous electrolyte and a battery case for housing said electrode group and said non-aqueous electrolyte, characterized in that said electrode group comprises a positive electrode, a negative electrode and a separator interposed between said positive and negative electrodes, said positive electrode comprises a lithium transition metal composite oxide, and said negative electrode is the negative electrode in accordance with claim 1.

* * * * *